(12) United States Patent
Hong et al.

(10) Patent No.: US 12,231,915 B2
(45) Date of Patent: Feb. 18, 2025

(54) METHOD AND ELECTRONIC DEVICE FOR SWITCHING ANTENNA

(71) Applicant: SAMSUNG ELECTRONICS CO., LTD., Suwon-si (KR)

(72) Inventors: Sukgi Hong, Suwon-si (KR); Youngsuk Yoo, Suwon-si (KR); Woosup Lee, Suwon-si (KR); Dongyeon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 427 days.

(21) Appl. No.: 17/669,799

(22) Filed: Feb. 11, 2022

(65) Prior Publication Data

US 2022/0240102 A1 Jul. 28, 2022

Related U.S. Application Data

(63) Continuation of application No. PCT/KR2022/000852, filed on Jan. 17, 2022.

(30) Foreign Application Priority Data

Jan. 25, 2021 (KR) .................. 10-2021-0009914

(51) Int. Cl.
*H04W 16/28* (2009.01)
*H01Q 21/06* (2006.01)
(Continued)

(52) U.S. Cl.
CPC .......... *H04W 16/28* (2013.01); *H01Q 21/065* (2013.01); *H04W 40/06* (2013.01); *H04W 40/12* (2013.01)

(58) Field of Classification Search
CPC ...... H01Q 21/065; H04B 7/0604; H04B 7/10; H04W 16/28; H04W 40/06; H04W 40/12
See application file for complete search history.

(56) References Cited

U.S. PATENT DOCUMENTS 5,584,057 A * 12/1996 Dent .................... H04B 7/0671
455/105
7,034,758 B2 4/2006 Haidacher et al.
(Continued)

FOREIGN PATENT DOCUMENTS

| CN | 113271593 A | * | 8/2021 | ........... H04B 1/7163 |
| EP | 3866524 A1 | * | 8/2021 | ........... H04B 1/7163 |

(Continued)

OTHER PUBLICATIONS

Search Report and Written Opinion issued Apr. 20, 2022 in counterpart International Patent Application No. PCT/KR2022/000852.

*Primary Examiner* — Eric Nowlin
(74) *Attorney, Agent, or Firm* — NIXON & VANDERHYE P.C.

(57) ABSTRACT

According to various embodiments, the electronic device may include: a first antenna having a first polarization characteristic, a second antenna a having a second polarization characteristic different from the first polarization characteristic, a switch operatively connected to the first antenna and the second antenna, and a processor operatively connected to the first antenna and the second antenna through the switch. The processor may be configured to identify, based on transmitting at least one packet using the first antenna, at least one timestamp of the packet, control the electronic device to transmit a first area of the packet based on a first timestamp of the identified timestamp using the first antenna, switch the first antenna to the second antenna based on a second timestamp of the identified timestamp, and control the electronic device to transmit a second area of the packet based on the second timestamp of the packet using the second antenna.

19 Claims, 9 Drawing Sheets

(51) Int. Cl.
*H04W 40/06* (2009.01)
*H04W 40/12* (2009.01)

(56) References Cited

U.S. PATENT DOCUMENTS

| | | | |
|---|---|---|---|
| 7,627,291 B1* | 12/2009 | James-Roxby | H01Q 1/2283 375/328 |
| 7,869,416 B2* | 1/2011 | Ramakrishna | H04B 1/707 370/335 |
| 9,094,163 B2* | 7/2015 | Saint Georges | H04L 41/00 |
| 9,350,444 B2* | 5/2016 | Tarighat Mehrabani | H04B 7/2656 |
| 9,742,482 B2* | 8/2017 | Tarighat Mehrabani | H04B 7/10 |
| 10,469,127 B2 | 11/2019 | McLaughlin et al. | |
| 10,785,777 B2* | 9/2020 | Eitan | H04L 1/009 |
| 10,992,419 B1* | 4/2021 | Zhou | H04L 1/0618 |
| 11,445,468 B2* | 9/2022 | Yang | H04L 43/08 |
| 11,569,882 B2* | 1/2023 | Zhu | H04L 5/0044 |
| 11,882,455 B2* | 1/2024 | Schober | H04W 12/61 |
| 2002/0083458 A1* | 6/2002 | Henderson | H01Q 1/24 343/788 |
| 2006/0035608 A1* | 2/2006 | Zhang | H04B 7/061 455/101 |
| 2007/0066361 A1 | 3/2007 | Knudsen et al. | |
| 2009/0034643 A1* | 2/2009 | Ahn | H04L 27/2602 375/267 |
| 2009/0225885 A1* | 9/2009 | Aoki | H04B 7/08 375/260 |
| 2012/0039321 A1* | 2/2012 | Ghosh | H04L 1/0025 370/338 |
| 2013/0065537 A1* | 3/2013 | Yepez | H04L 25/0224 455/67.11 |
| 2013/0113117 A1 | 5/2013 | Haralabidis et al. | |
| 2013/0148553 A1* | 6/2013 | Ekbatani | H04B 7/10 370/476 |
| 2015/0057007 A1* | 2/2015 | Tarighat Mehrabani | H04B 7/0608 455/552.1 |
| 2016/0174244 A1 | 6/2016 | Kim et al. | |
| 2016/0226572 A1* | 8/2016 | Tarighat Mehrabani | H04B 7/10 |
| 2017/0373712 A1 | 12/2017 | Kim et al. | |
| 2018/0248811 A1 | 8/2018 | Di Nallo et al. | |
| 2019/0237844 A1* | 8/2019 | Rogers | H01Q 9/0407 |
| 2019/0386380 A1 | 12/2019 | Ham et al. | |
| 2020/0396035 A1 | 12/2020 | Yu et al. | |
| 2021/0028839 A1 | 1/2021 | Oteri et al. | |
| 2021/0076350 A1* | 3/2021 | Yang | G01S 3/50 |
| 2021/0135364 A1* | 5/2021 | Yamada | H01Q 9/045 |
| 2021/0258795 A1* | 8/2021 | Schober | H04W 12/63 |
| 2022/0094053 A1* | 3/2022 | Jiang | H01Q 5/42 |
| 2022/0102874 A1* | 3/2022 | Khripkov | H01Q 13/106 |

FOREIGN PATENT DOCUMENTS

| | | | | |
|---|---|---|---|---|
| EP | 4354928 A1 * | 4/2024 | | G01S 13/765 |
| KR | 10-0834644 | 6/2008 | | |
| KR | 10-2013-0111162 | 10/2013 | | |
| KR | 10-2016-0073511 | 6/2016 | | |
| KR | 10-2018-0009645 | 1/2018 | | |
| KR | 10-2019-0141474 | 12/2019 | | |
| WO | 2018/017920 | 1/2018 | | |
| WO | WO-2024132026 A1 * | 6/2024 | | G01S 1/024 |

* cited by examiner

METHOD AND ELECTRONIC DEVICE FOR SWITCHING ANTENNA

CROSS-REFERENCE TO RELATED APPLICATIONS

This application is a continuation of International Application No. PCT/KR2022/000852 designating the United States, filed on Jan. 17, 2022, in the Korean Intellectual Property Receiving Office and claiming priority to Korean Patent Application No. 10-2021-0009914, filed on Jan. 25, 2021, in the Korean Intellectual Property Office, the disclosures of which are incorporated by reference herein in their entireties.

BACKGROUND

Field

The disclosure relates to an antenna switching method and an electronic device.

Description of Related Art

In line with development of wireless communication technologies, electronic devices (for example, electronic devices for communication) are widely used in daily life, and ultra wide band (UWB) communication (for example, super-wide-band communication) has recently been highlighted as a new type of communication technology. An electronic device supporting UWB communication may measure the position of an external electronic device (for example, target device) performing UWB communication, based on a wide bandwidth (for example, about 500 MHz).

As a result of establishment of a new IEEE standard referred to as 802.15.4z, an STS (scrambled time stamp) field has been added to UWB communication. Based on the STS field, security of UWB communication has been improved, and the same may be used for position measurement regarding the electronic device and the external electronic device in a safer manner.

UWB communication (for example, super-wide-band communication) is a short-range high-speed communication, and supports high-speed communication in short ranges, but has limitations due to low transmission power levels. UWB communication, which is based on high frequency bands (for example, about 6-8 GHz), has lower diffraction characteristics and stronger straightness than lower frequency bands, and thus may be heavily affected by obstacles. When an electronic device having an antenna supporting UWB communication performs UWB communication, a shaded area having degraded UWB communication quality may occur. An electronic device supporting UWB communication may include multiple different antennas having different polarization characteristics, and may switch the multiple antennas, thereby improving the performance of UWB communication.

SUMMARY

Various embodiments of the disclosure may provide a method for switching antennas in order to improve the performance of UWB communication in connection with an electronic device including multiple antennas supporting UWB communication, and an electronic device for implementing the same.

An electronic device according to various example embodiments may include: a communication module comprising communication circuitry, a first antenna having a first polarization characteristic, a second antenna having a second polarization characteristic different from the first polarization characteristic, a switch operatively connected to the communication module, the first antenna, and the second antenna, and a processor operatively connected to the first antenna and the second antenna through the switch. The processor may be configured to: identify, based on transmitting at least one packet using the first antenna, at least one timestamp of the packet, control the electronic device to transmit a first area of the packet using the first antenna based on a first timestamp of the identified timestamps, switch from the first antenna to the second antenna based on a second timestamp of the identified timestamps, and control the electronic device to transmit a second area of the packet using the second antenna based on the second timestamp of the packet.

A method of operating an electronic device according to various example embodiments may include: identifying, based on transmitting at least one packet using a first antenna having a first polarization characteristic, at least one timestamp of the packet, transmitting a first area of the packet using the first antenna based on a first timestamp of the identified timestamp, switching from the first antenna to a second antenna having an characteristic different from that of the first antenna based on a second timestamp of the identified timestamp, and transmitting a second area of the packet using the second antenna based on the second timestamp of the packet.

According to various example embodiments of the disclosure, in connection with an electronic device including multiple antennas having different polarization characteristics (for example, metal antenna, laser direct structuring (LDS) antenna, and/or patch antenna), UWB communication may be performed by switching the multiple antennas. In order to improve the performance of UWB communication, according to various example embodiments, a first antenna and a second antenna which have different polarization characteristics may be switched.

According to various example embodiments of the disclosure, an electronic device may perform UWB communication by switching a first antenna and a second antenna which have different polarization characteristics, and may maintain the performance of UWB communication in wider areas. Various other advantageous effects identified explicitly or implicitly through the disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
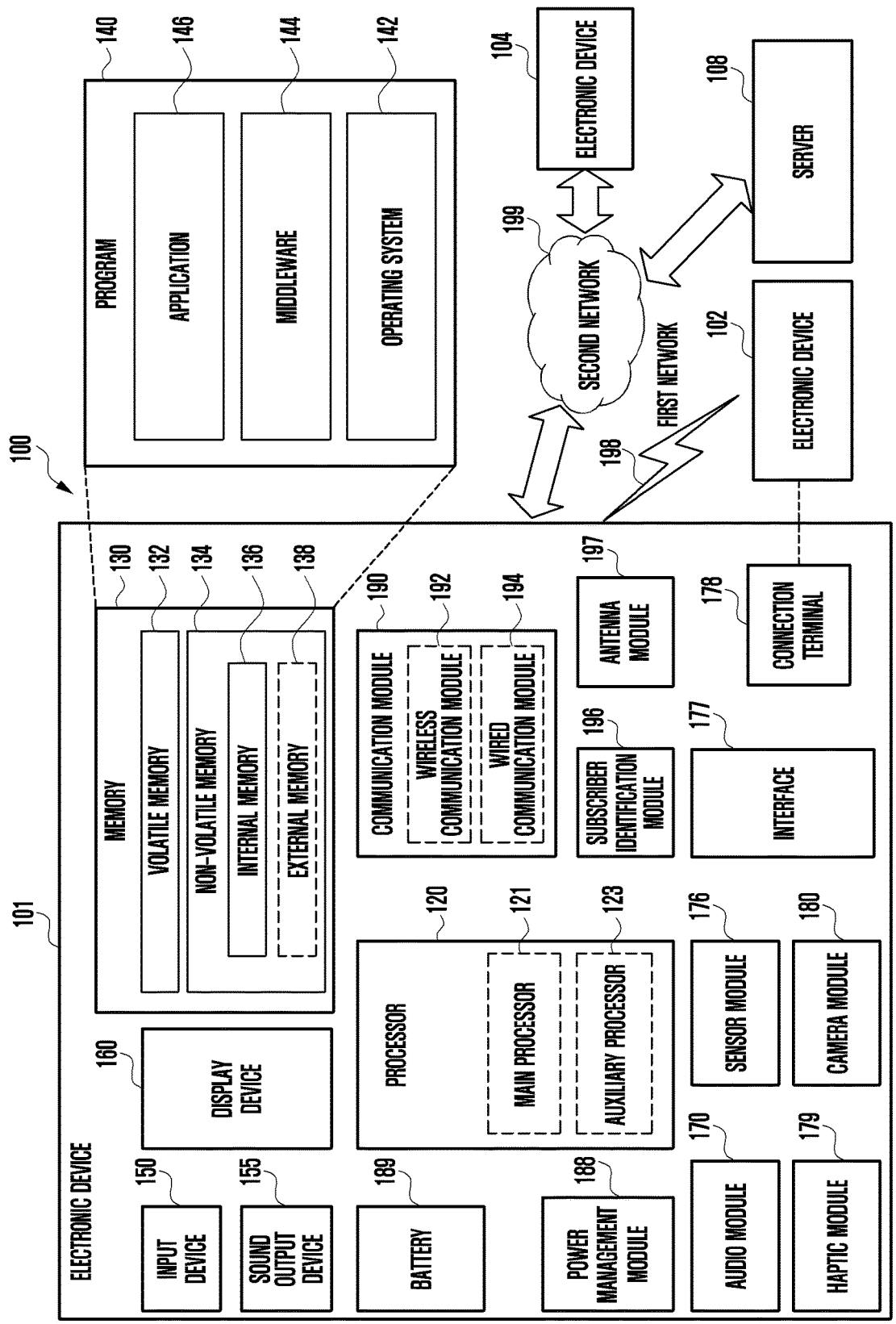
FIG. 1 is a block diagram illustrating an example electronic device in a network environment according to various embodiments.

FIG. 1 is a block diagram illustrating an example electronic device in a network environment according to an embodiment of the disclosure. Referring to FIG. 1, an electronic device 101 in a network environment 100 may communicate with an electronic device 102 via a first network 198 (e.g., a short-range wireless communication network), or at least one of electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display module 160, an audio module 170, a sensor module 176, an interface 177, a connecting terminal 178, a haptic module 179, a camera module 180, a power management module 188, a battery 189, a communication module 190, a subscriber identity module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes. According to an embodiment, the camera module 180 may include a front camera disposed on the front surface of the electronic device 101 and a rear camera disposed on the rear surface of the electronic device 101.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
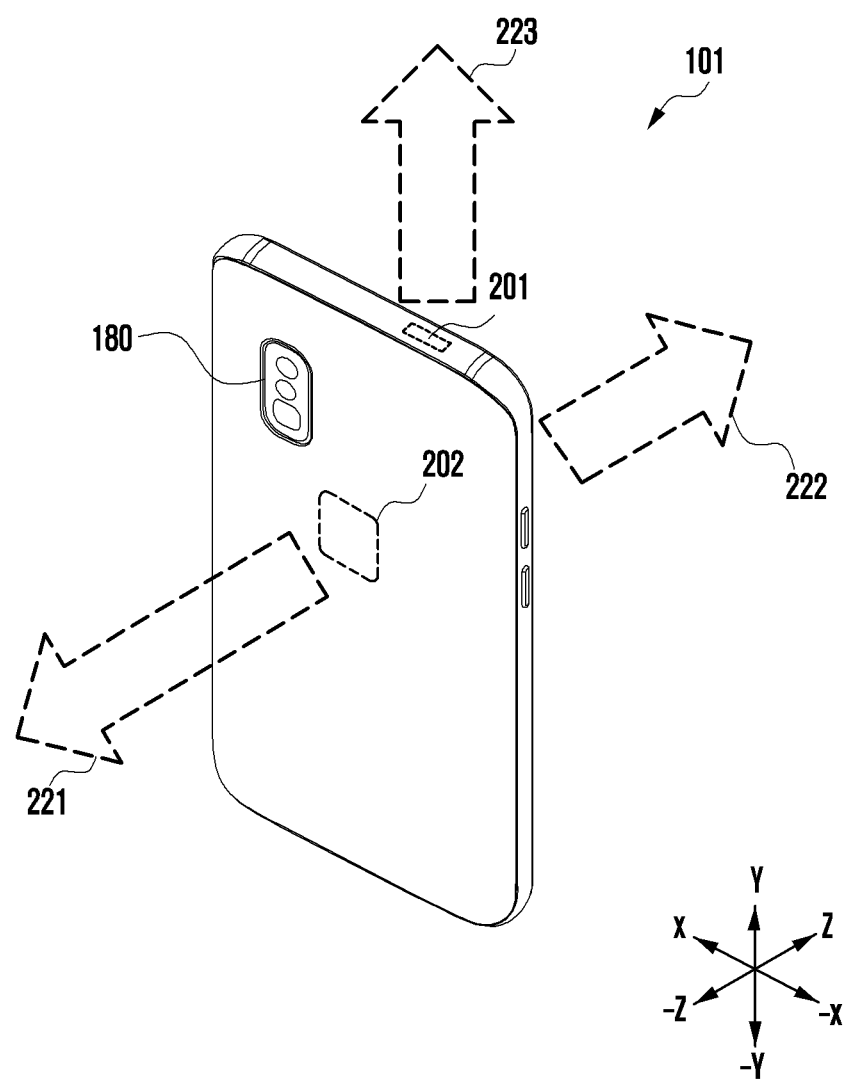
FIG. 2 is a perspective view of an electronic device including multiple antennas according to various embodiments.

FIG. 2 is a perspective view of an electronic device including multiple antennas according to various embodiments.

Referring to FIG. 2, an electronic device (for example, electronic device 101 in FIG. 1) may include multiple antenna modules (for example, the antenna module 197 in FIG. 1) supporting ultra wide band communication. For example, the electronic device 101 may include a first antenna 201 disposed adjacent to a surface (for example, a lateral surface) rather than a front surface and/or a rear surface, and a second antenna 202 disposed adjacent to the rear surface. For example, the first antenna 201 may radiate a wireless communication signal corresponding to Y direction 223 with reference to the electronic device 101 and the second antenna 202 may radiate a wireless communication signal corresponding to a rear surface direction (for example, −Z direction 221) with reference to the electronic device 101. According to an embodiment, the first antenna 201 and the second antenna 202 may be disposed at a lateral surface of the electronic device 101 and a rear surface of the electronic device 101, respectively, and may be disposed to radiate wireless communication signals based on different directions. According to an embodiment, the first antenna 201 and the second antenna 202 may be disposed at the same surface (for example, a front surface, rear surface, and/or lateral surface), and may radiate wireless communication signals having different polarization characteristics.

According to an embodiment, the first antenna 201 and the second antenna 202 may be disposed at different height, different positions, and/or different planes. According to an embodiment, the first antenna 201 and the second antenna 202 may be implemented in different types of antennas and designed to have at least one different characteristic from among radiation coverage, a polarization characteristic, a radiation pattern, gain, and/or a frequency channel characteristic of an antenna. According to an embodiment, the arrangement positions of the first antenna 201 and the second antenna 202 are not limited to the view of FIG. 2 and may be designed to include wider radiation coverage (for example, a radiation area and/or a radiation range). According to an embodiment, the first antenna 201 and the second antenna 202 may be electrically connected to a communication module (for example, the communication module 190 in FIG. 1) of the electronic device 101.

According to an embodiment, the first antenna 201 and the second antenna 202 may be formed in different types of antennas or in a single antenna. For example, the first antenna 201 may include a metal antenna of which at least a portion is formed of a metal material and/or a laser direct structuring (LDS) antenna of which at least a portion has a metal pattern designed thereon. According to an embodiment, the first antenna 201 may be designed to radiate a wireless communication signal, based on a first polarization direction (for example, Y direction 223). For example, the second antenna 202 may include a UWB antenna supporting wideband communication (for example, a UWB communication) and may include one or more patch antennas designed to measure a position with respect to an external electronic device (for example, a target device). According to an embodiment, the second antenna 202 may be designed to radiate a wireless communication signal, based on a second polarization direction (for example, −Z direction 221, rear surface direction). According to an embodiment, the second antenna 202 may be designed to radiate a wireless communication signal, based on a third polarization direction (for example, Z direction 222, front surface direction). According to an embodiment, the second antenna 202 may be designed to have substantially the same radiation performance in response to −Z direction 221 (for example, a second polarization direction) and/or Z direction 222 (for example, a third polarization direction). According to an embodiment, the electronic device 101 may measure an angle of arrival (AoA) for an external electronic device using the second antenna 202 and may determine, based on the measured AoA value, a position of the external electronic device.

According to an embodiment, the electronic device 101 including different types of antennas (for example, the first antenna 201 and/or the second antenna 202) may transmit and receive at least one packet upon performing wireless communication with another external electronic device. When transmitting at least one packet, the electronic device 101 may identify a timestamp (for example, a first timestamp and/or a second timestamp). The electronic device 101 may separate one packet into a first packet area and/or a second packet area, and transmit the same, based on the identified timestamp (for example, a first timestamp). For example, the electronic device 101 may select at least one antenna (for example, the first antenna 201) at the identified first timestamp and transmit the first packet area using the selected first antenna 201. The electronic device 101 may select at least one antenna (for example, the second antenna 202) at a timestamp (for example, a second timestamp) when the first packet transmission is completed, and transmit the second packet area using the selected second antenna 202. According to an embodiment, the electronic device 101 may perform a switching operation to select the first antenna 201, based on the first timestamp, and perform a switching operation to select the second antenna 202, based on the second timestamp.

According to an embodiment, the electronic device 101 may transmit the first packet area through the first antenna 201 at the first timestamp, and transmit the second packet area through the second antenna 202 at the second timestamp. According to an embodiment, the first antenna 201 and the second antenna 202 may be implemented to have different characteristics (for example, radiation coverage, polarization performance, a radiation pattern, a radiation direction, gain, and/or a frequency channel characteristic). According to an embodiment, the electronic device 101 may perform ultra wide band wireless communication (for example, UWB communication) with an external electronic device, based on a wider radiation coverage.

Figure 3:
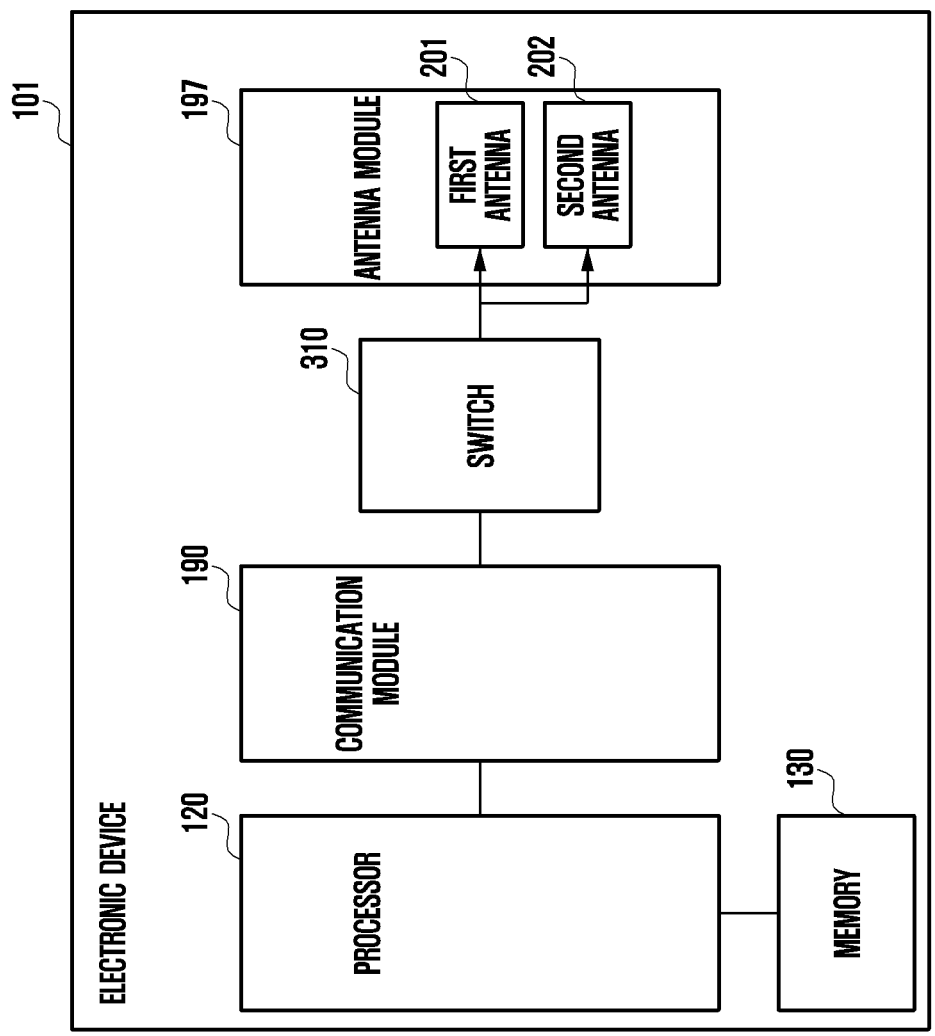
FIG. 3 is a block diagram illustrating an example configuration of an electronic device including multiple antennas according to various embodiments.

FIG. 3 is a block diagram illustrating an example configuration of an electronic device including multiple antennas according to various embodiments.

Referring to FIG. 3, an electronic device (for example, the electronic device 101 in FIG. 1) may include a processor (e.g., including processing circuitry) 120 (for example, the processor 120 in FIG. 1), a memory 130 (for example, the memory 130 in FIG. 1), a communication module (e.g., including communication circuitry) 190 (for example, the communication module 190 in FIG. 1), an antenna module (e.g., including at least one antenna) 197 (for example, the antenna module 197 in FIG. 1) and/or a switch 310. The antenna module 197 may include a first antenna 201 (for example, the first antenna 201 in FIG. 2) and/or a second antenna 202 (for example, the second antenna 202 in FIG. 2), and may include an UWB antenna supporting an ultra wide band communication method (for example, ultra wide band (UWB) communication). For example, the first antenna 201 and/or the second antenna 202 may be implemented to have different characteristics (for example, radiation coverage, polarization performance, a radiation pattern, a radiation direction, gain, and/or a frequency channel characteristic). For example, the first antenna 201 may include a metal antenna and the second antenna 202 may include a patch antenna.

According to an embodiment, the first antenna 201 and the second antenna 202 may have polarization characteristics by combining two components of polarization and may be designed to have different characteristics. For example, the first antenna 201 may have a polarization characteristic, based on an H component (horizontal) (for example, an H-pol characteristic) and the second antenna 202 may have a polarization characteristic, based on a V component (vertical) (for example, a V-pol characteristic). The first antenna 201 may perform wireless communication based on the H component and the second antenna 202 may perform wireless communication based on the V component. According to an embodiment, the electronic device 101 may perform, based on the first antenna 201 and the second antenna 202, complementary UWB communication. A communication procedure, a communication method, and a communication manner of the first antenna 201 and the second antenna 202 may be determined based on each polarization characteristic. According to an embodiment, the electronic device 101 may perform UWB communication through the first antenna 201, the second antenna 202, based on each polarization characteristic.

According to an embodiment, by executing a program (for example, a program 140 in FIG. 1) stored in the memory 130, the processor 120 may control at least one other component (for example, a hardware or software component) and process various data or perform operations. According to an embodiment, the processor 120 may include various processing circuitry and measure a signal quality with respect to an external electronic device (for example, a target device, an external electronic device connected to the electronic device 101 through wireless communication, and the electronic device 102 and 104 in FIG. 1) by partially controlling the communication module 190. Based on the measured signal quality, the processor 120 may select one of the multiple antennas (for example, the first antenna 201 and/or the second antenna 202) included in the antenna module 190 to perform wireless communication.

According to an embodiment, the memory 130 may store a measured signal quality value corresponding to each of multiple antennas (for example, the first antenna 201 and/or the second antenna 202) and based on the measured signal quality value, store an algorithm for selecting at least one antenna. The memory 130 may store a table related to a signal quality for selecting at least one antenna, based on the measured signal quality value. The table related to a signal quality may include information for maintaining the optimum communication condition by a developer and may be configured by a developer.

According to an embodiment, the processor 120 may receive, from an external electronic device, a first signal which is a response signal for a signal transmitted in response to ultra wide band wireless communication and may measure a first signal quality value corresponding to the first signal. The processor 120 may receive, from an external electronic device, a second signal which is a response signal for a signal transmitted in response to ultra wide band wireless communication and may measure a second signal quality value corresponding to the second signal. For example, the first signal and/or the second signal may include a wireless communication signal which is transmitted or received based on a frequency band corresponding to ultra wide band communication (for example, UWB communication). According to an embodiment, the processor 120 may compare a difference value between the first signal quality value and the second signal quality value with a predetermined (e.g., specified) threshold value to select at least one of the first antenna 201 and the second antenna 202. For example, when the difference value is smaller than the predetermined (e.g., specified) threshold value, the processor 120 may perform wireless communication with an external electronic device through the first antenna 201. For example, when the difference value is larger than the predetermined (e.g., specified) threshold value, the processor 120 may switch from the first antenna 201 to the second antenna 202, and may perform wireless communication with an external electronic device through the switched second antenna 202. According to an embodiment, the processor 120 may compare and analyze at least one piece of data related to wireless communication with an external electronic device and may select at least one antenna for improving the wireless communication quality (for example, performance), based on the at least one piece of data. The processor 120 may perform ultra wide band communication with an external device using the selected antenna.

According to an embodiment, the communication module 190 may be operatively connected to the first antenna 201 and the second antenna 202 included in the antenna module 197 through the switch 310. The processor 120 may at least partially control the switch 310 through the communication module 190 and may control the switch 310 to select at least one antenna having an excellent signal quality in ultra wide band communication. According to an embodiment, the communication module 190 may select at least one of the first antenna 201 and the second antenna 202 configured to support ultra wide band communication and perform ultra wide band communication.

According to an embodiment, the switch 310 may operatively connect at least one antenna included in the antenna module 197 and the communication module 190. The processor 120 may at least partially control the switch 310 through the communication module 190 and may control the switch 310 to select at least one of the first antenna 201 and/or the second antenna 202 included in the antenna module 197.

According to an embodiment, the antenna module 197 may include multiple antennas (for example, the first antenna 201 and/or the second antenna 202) supporting ultra wide band communication (for example, UWB communication). According to an embodiment, the first antenna 201 and the second antenna 202 may have different characteristics (for example, radiation coverage, polarization performance, a radiation pattern, a radiation direction, gain, and/or a frequency channel characteristic). For example, the first antenna 201 may be designed to have a first polarization direction (for example, +Y to −Y direction in FIG. 2) and the second antenna 202 may be designed to have a second polarization direction (for example, +X to −X direction in FIG. 2). According to an embodiment, the first polarization direction may be implemented to be perpendicular to the second polarization direction. According to an embodiment, the first polarization direction and the second polarization direction are not limited to be perpendicular to each other. According to an embodiment, the first antenna 201 and the second antenna 202 may be designed to complement each other. According to an embodiment, the electronic device 101 may measure a first signal quality value corresponding to the first antenna 201 having the first polarization direction and a second signal quality value corresponding to the second antenna 202 having the second polarization direction. According to an embodiment, the electronic device 101 may select an antenna (for example, a transmission antenna for example a TX antenna) having a relatively excellent signal quality (for example, performance) based on the first signal quality value and the second signal quality value and measure an angle of arrival (AoA) with respect to an external electronic device using the selected antenna. The electronic device 101 may determine a position of the external electronic device, based on the measured AoA.

According to an embodiment, the electronic device 101 may identify a signal quality with an external electronic device, based on the first antenna 201 and/or the second antenna 202, and select at least one antenna having a relatively excellent signal quality to transmit a wireless communication signal (for example, a transmission signal for example a TX signal) to the external electronic device. The electronic device 101 may receive a response signal with respect to the external electronic device, through the selected antenna.

According to an embodiment, the first antenna 201 may be designed to have a first polarization characteristic (for example, Y direction in FIG. 2) based on a conductive member (e.g., including a metal). The first antenna 201 may include a metal antenna of which at least a portion is formed of a metal material and/or a laser direct structuring (LDS) antenna of which at least a portion has a metal pattern designed thereon. For example, the first antenna 201 may be connected to a conductive member which is at least partially exposed outside through the housing of the electronic device 101. The first antenna 201 may be designed to radiate a communication signal in the first polarization direction (for example, Y direction in FIG. 2). For example, using the first antenna 201, the electronic device 101 may perform UWB communication in a direction parallel with the X axis or perpendicular to the Y axis in FIG. 2.

According to an embodiment, the second antenna 202 may include a UWB antenna supporting wideband communication (for example, UWB communication) and may include one or more patch antennas designed to measure a position with respect to an external electronic device. According to an embodiment, the second antenna 202 may include multiple patch antennas and measure a distance from an external electronic device and an angle with an external electronic device. For example, the processor 120 may measure a distance from an external electronic device using one or more patch antennas included in the second antenna 202, and measure an angle (for example, an AoA value) with an external electronic device using at least two patch antennas. For example, the second antenna 202 may be designed as a patch antenna having a "L" shape and disposed at a rear plate of the housing of the electronic device 101. According to an embodiment, a positioning operation (for example, AoA measurement and AoA operation) based on UWB communication may require multiple patch antennas arranged parallel with each other on the same axis. For example, the second antenna 202 may include three patch antennas, the first patch antenna and the second patch antenna may be designed to be arranged based on a height direction (for example, Y direction or vertical direction in FIG. 2) of the electronic device 101 and the first antenna and the third antenna may be designed to be arranged based on a width direction (for example, X direction or horizontal direction in FIG. 2) of the electronic device 101. For example, the second patch antenna may be disposed spaced a configured distance apart in the vertical direction with reference to the first patch antenna, and the third patch antenna may be disposed spaced a configured distance apart in the horizontal direction with reference to the first patch antenna. For example, one or more patch antennas may be designed to have an characteristic complementary with another antenna. According to an embodiment, the electronic device 101 may secure a wider range of communication coverage using multiple antennas having different characteristics.

According to an embodiment, when performing UWB communication, the electronic device 101 may perform UWB communication in at least one of two operation modes (for example, a portrait mode (or vertical mode) and/or a landscape mode (or horizontal mode)). According to an embodiment, the electronic device 101 may perform a positioning operation with respect to an external electronic device based on the first patch antenna and the third patch antenna arranged to be correspond to the width direction (for example, X direction in FIG. 2) of the electronic device 101 in the portrait mode (vertical mode). The electronic device 101 may perform a positioning operation with respect to an external electronic device based on the first patch antenna and the second patch antenna arranged to be correspond to the height direction (for example, Y direction in FIG. 2) of the electronic device 101 in the landscape mode (horizontal mode). The electronic device 101 may perform a UWB communication-based positioning operation using at least two antennas arranged based on an axial direction corresponding to the horizontal line.

According to various embodiments, the electronic device 101 including the first antenna 201 (for example, a metal antenna and/or an LDS antenna) having a first polarization characteristic and the second antenna 202 (for example, a UWB antenna and a patch antenna) having a second polarization characteristic different from the first polarization characteristic may perform switching to one of the first antenna 201 and the second antenna 202 so as to improve UWB communication performance. According to an embodiment, when transmitting a packet for wireless communication, the electronic device 101 may identify at least one timestamp (for example, a first timestamp and/or a second timestamp) corresponding to the packet and switch an antenna based on the timestamp. For example, the electronic device 101 may separate a first packet area and a second packet area, based on the first timestamp, and transmit the first packet area using the first antenna 201 and the second packet area using the second antenna 202. According to an embodiment, the electronic device 101 may perform, based on the first timestamp, switching to one of the first antenna 201 and the second antenna 202.

According to various example embodiments, the electronic device may include: a communication module comprising communication circuitry, a first antenna having a first polarization characteristic, a second antenna having a second polarization characteristic different from the first polarization characteristic, a switch operatively connected to the first antenna and the second antenna, and a processor operatively connected to the first antenna and the second antenna through the switch. The processor may be configured to: identify, based on transmitting at least one packet using the first antenna, at least one timestamp of the packet, control the electronic device to transmit a first area of the packet based on a first timestamp of the identified timestamp using the first antenna, switch the first antenna to the second antenna based on a second timestamp of the identified timestamp, and transmit a second area of the packet based on the second timestamp of the packet using the second antenna.

According to an example embodiment, the first antenna and the second antenna may have different characteristics and the characteristics may include at least one of radiation coverage, polarization performance, a radiation pattern, a radiation direction, gain, and/or a frequency channel characteristic.

According to an example embodiment, the processor may be configured to: measure a first signal quality value of a wireless communication signal based on the first antenna, measure a second signal quality value of a wireless communication signal based on the second antenna, and determine whether to switch to select at least one of the first antenna and the second antenna, based on the first signal quality value and the second signal quality value.

According to an example embodiment, the first antenna may have a first polarization characteristic based on a conductive member comprising a metal material.

According to an example embodiment, the first antenna may include a metal antenna at least a portion of which is formed of a metal material and/or a laser direct structuring (LDS) antenna at least a portion of which has a metal pattern included thereon.

According to an example embodiment, the second antenna may support wideband communication and include one or more patch antennas configured to measure a position with respect to an external electronic device.

According to an example embodiment, the processor may be configured to measure a position with respect to the external electronic device using at least two patch antennas of the one or more patch antennas.

According to an example embodiment, the first antenna and the second antenna may have characteristics complementary each other to provide a wider communication coverage.

According to an example embodiment, the processor may be configured to switch from the second antenna to the first antenna after transmitting the second area of the packet.

According to an example embodiment, the processor may configure, as a first timestamp, a timestamp at which a start of frame delimiter (SFD) field included in the packet and indicating a frame start is ended.

According to an example embodiment, the processor may configure, as a second timestamp, a timestamp at which a scrambled timestamp sequence (STS) field included in the packet and having security-related information stored therein is ended.

According to an example embodiment, the processor may configure the second timestamp, based on at least one gap area included in the STS field.

Figure 4:
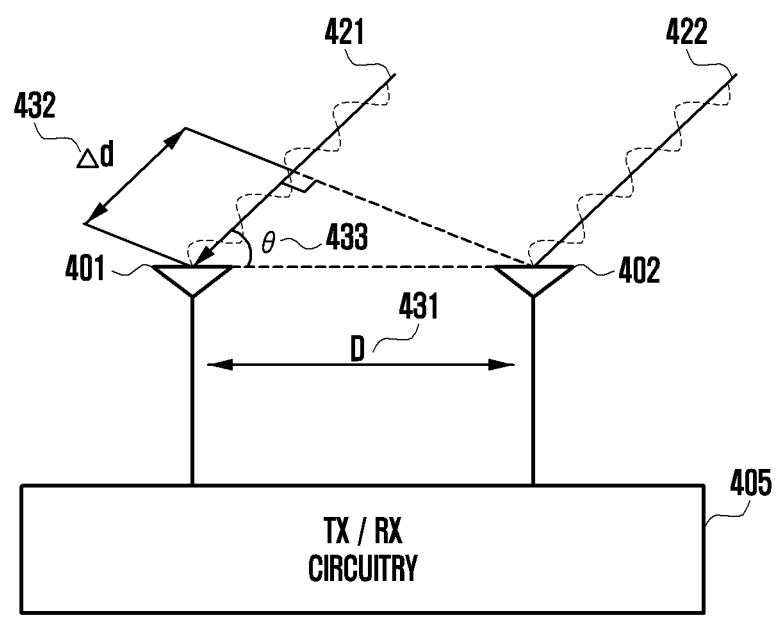
FIG. 4 is a diagram illustrating an example process for measuring an angle of arrival (AoA) with respect to an external electronic device using an ultra wide band (UWB) antenna according to various embodiments.

FIG. 4 is a diagram illustrating an example process for measuring an angle of arrival (AoA) with respect to an external electronic device using an ultra wide band (UWB) antenna according to various embodiments.

Referring to FIG. 4, an electronic device (for example, the electronic device 101 in FIG. 1) including a first antenna (for example, the first antenna 201 in FIG. 2) having a first polarization characteristic and a second antenna (for example, the second antenna 202 in FIG. 2) having a second characteristic different from the first characteristic may perform a positioning operation (for example, an AoA measuring operation) with respect to an external electronic device using multiple patch antennas included in the second antenna 202. The electronic device 101 may measure an AoA value with respect to an external electronic device using at least two of the multiple patch antennas and may determine, based on the measured AoA value, a position of the external electronic device.

According to an embodiment, the second antenna 202 may include multiple patch antennas, and the electronic device 101 may perform a UWB operation using at least two patch antennas (for example, the first patch antenna 401 and the second patch antenna 402). According to an embodiment, the multiple patch antennas may be designed to be arranged in an "L" shape. According to an embodiment, a positioning operation (for example, an AoA measuring operation) based on UWB communication may require multiple patch antennas arranged parallel with each other on the same axis. For example, the first patch antenna 401 and the second patch antenna 402 may be designed to be arranged based on the vertical direction (for example, Y direction in FIG. 2) of the electronic device 101. The first patch antenna 401 and a third patch antenna (not shown) may be designed to be arranged based on the horizontal direction (for example, X direction in FIG. 2) of the electronic device 101. For example, the second patch antenna 402 may be disposed spaced apart by a configured distance (for example, the distance D 431) in the vertical direction with reference to the first patch antenna 401, and the third patch antenna (not shown) may be disposed spaced apart by a configured distance (for example, a distance D 431) in the horizontal direction with reference to the first patch antenna.

According to an embodiment, when performing UWB communication, the electronic device 101 may perform UWB communication in, for example, one of two operation modes (for example, a portrait mode (or vertical mode) and/or a landscape mode (or horizontal mode)). According to an embodiment, the electronic device 101 may perform a positioning operation with respect to an external electronic device based on the first patch antenna 401 and the third patch antenna (not shown) arranged to correspond to the width direction (for example, X direction in FIG. 2) of the electronic device 101 in the portrait mode (vertical mode). The electronic device 101 may perform a positioning operation with respect to an external electronic device based on the first patch antenna 401 and the second patch antenna 402 arranged to be correspond to the height direction (for example, Y direction in FIG. 2) of the electronic device 101 in the landscape mode (horizontal mode). The electronic device 101 may perform a UWB communication-based positioning operation using at least two antennas arranged based on an axial direction corresponding to the horizontal line.

Referring to FIG. 4, the first patch antenna 401 and/or the second patch antenna 402 of the multiple patch antennas included in the second antenna 202 may be electrically connected to a transmitting and receiving circuitry (Tx/Rx circuitry) 405 for UWB wireless communication. The transmitting and receiving circuitry 405 may be included in a communication module (for example, the communication module 190 in FIG. 1) of the electronic device 101. According to an embodiment, the distance D 431 by which the first patch antenna 401 and the second patch antenna 402 are spaced apart from each other may be information stored in a memory (for example, the memory 130 in FIG. 1). According to an embodiment, the electronic device 101 may transmit a UWB signal according to ultra wide band communication to an external electronic device and may receive, from the external electronic device, a first signal 421 and/or a second signal 422 which is a response signal for the UWB signal. For example, the electronic device 101 may compare a first reception time of the first signal 421 received via the first patch antenna 401 and a second reception time of the second signal 422 received via the second patch antenna 402. The electronic device 101 may calculate an arrival distance difference Δd 432 (for example, a distance between the electronic device 101 and an external electronic device) from an external electronic device using a time difference between the first reception time and the second reception time. According to an embodiment, the arrival distance difference Δd 432 may be determined by a function of a phase difference Δφ 433 between the first signal 421 received via the first patch antenna 401 and the second signal 422 received via the second patch antenna 402. According to an embodiment, using [Formula 1] and [Formula 2] described below, the electronic device 101 may identify the phase difference 433 with an external electronic device, and measure an angle of arrival (AoA) with respect to the external electronic device, based on the phase difference 433. The AoA with respect to an external electronic device may be measured by reflecting a value measured using [Formula 1] and a value measured using [Formula 2] into [Formula 3]. According to an embodiment, the measurement of AoA may be defined as performing a positioning operation with respect to an external electronic device by the electronic device 101. For example, the electronic device 101 may identify a relative position of an external electronic device based on the measured AoA value when the electronic device 101 is the reference.

[Formula 1]

$$D = \Delta d^* \cos\theta \qquad \text{[Formula 2]}$$

According to an embodiment, the electronic device 101 may measure a spaced distance from an external electronic device and/or a relative angle with an external electronic device using the second antenna 202 including multiple patch antennas (for example, the first patch antenna 401 and the second patch antenna 402). For example, the electronic device 101 may measure a relative angle with respect to an external electronic device with reference to the electronic device 101.

Figure 5:
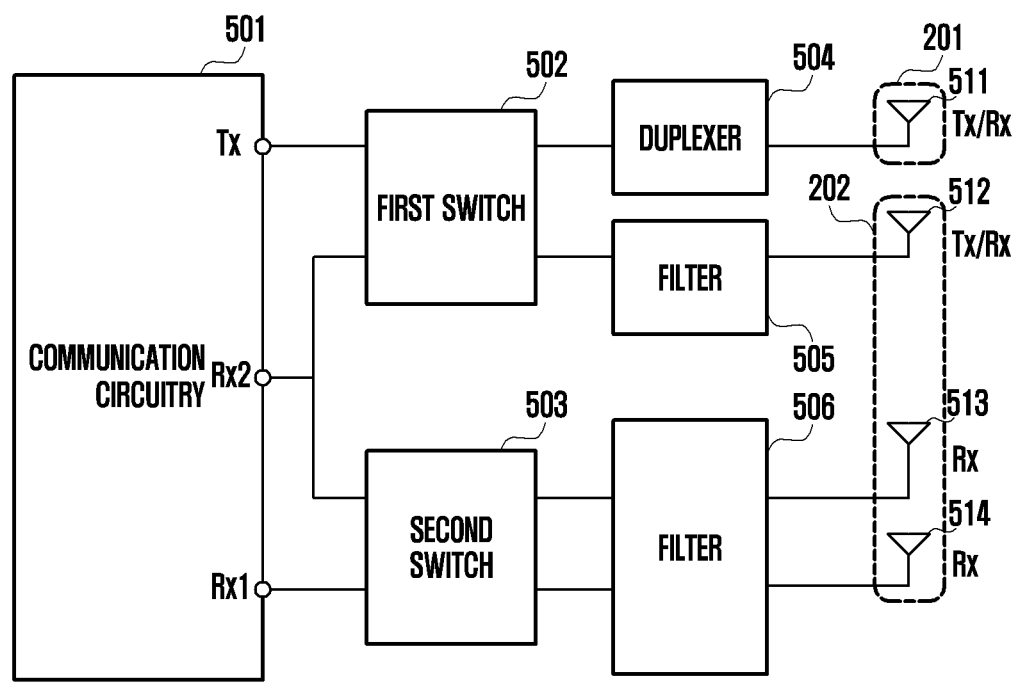
FIG. 5 is a block diagram illustrating an example configuration of communication circuitry of an electronic device including multiple antennas according to various embodiments.

FIG. 5 is a bock diagram illustrating an example configuration of communication circuitry of an electronic device including multiple antennas according to various embodiments.

Referring to FIG. 5, an electronic device (for example, the electronic device 101 in FIG. 1) may include a communication circuitry 501 (for example, the communication module 190 in FIG. 1) for performing UWB wireless communication. The communication circuitry 501 may be operatively connected to multiple antennas (for example, the first antenna 201 and/or the second antenna 202) supporting UWB wireless communication and may control at least one switch (for example, the first switch 502 and/or the second switch 503) to perform a transmission or reception operation of UWB wireless communication.

According to an embodiment, the first antenna 201 may include a metal antenna at least a portion of which is formed of a metal material and/or a laser direct structuring (LDS) antenna at least a portion of which has a metal pattern designed thereon. According to an embodiment, the first antenna 201 may be designed to support at least one communication method. According to an embodiment, the first antenna 201 may be designed to support various communication methods (for example, legacy LTE communication, 5G new radio (NR) communication) in common. For example, the first antenna 201 may be designed to partially support at least one of a Wi-Fi communication method, a legacy LTE communication method, a 5G NR communication method, and/or a BT (BLE) communication method. According to an embodiment, the second antenna 202 may include multiple patch antennas (for example, the first patch antenna 512, the second patch antenna 513, and/or the third patch antenna 514) for performing a positioning operation (for example, an AoA measuring operation) with respect to an external electronic device based on wideband communication (for example, UWB communication). For example, the first antenna 201 may include a conductive pattern antenna 511, and the second antenna 202 may include multiple patch antennas (for example, the first patch antenna 512, the second patch antenna 513, and/or the third patch antenna 514). According to an embodiment, the conductive pattern antenna 511 may be connected to the first switch 502 through a duplexer 504 (for example, a diplexer) for separating transmission and reception signals related to wireless communication. According to an embodiment, the multiple patch antennas (for example, the first patch antenna 512, the second patch antenna 513, and/or the third patch antenna 514) may be connected to at least one of the first switch 502 and/or the second switch 503 through filters 505 and 506, respectively. For example, the filter 505 and 506 may filter a communication signal transmitted or received based on a frequency band corresponding to UWB communication.

According to an embodiment, the conductive pattern antenna 511 corresponding to the first antenna 201 may transmit a transmission signal of UWB communication signal to an external electronic device and receive a reception signal (for example, a response signal for a transmission signal) of UWB communication signal from an external electronic device The conductive pattern antenna 511 may operate as a transmission and reception antenna for UWB communication signal.

According to an embodiment, the first patch antenna 512, the second patch antenna 513, and/or the third patch antenna 514 corresponding to the second antenna 202 may perform a transmission and reception operation for UWB communication signal. For example, the first patch antenna 512 may be connected to a transmission and reception terminal (for example, a Tx terminal and a Rx2 terminal) of the communication circuitry 501 through the first switch 502. The second patch antenna 513, and/or the third patch antenna 514 may be connected to a reception terminal (for example, a Rx2 terminal and a Rx1 terminal) of the communication circuitry 501 through the second switch 503. The electronic device 101 may process a transmission and reception signal of UWB communication using the first patch antenna 512 and process a reception signal of UWB communication using the second patch antenna 513, and/or the third patch antenna 514.

According to an embodiment, the first antenna 201 and/or the second antenna 202 may support ultra wide band communication (for example, UWB communication) and have different characteristics (for example, radiation coverage, polarization performance, a radiation pattern, a radiation direction, gain, and/or a frequency channel characteristic). For example, the first antenna 201 and/or the second antenna 202 may be implemented as antennas having polarization directions perpendicular to each other. According to an embodiment, as shown in FIG. 2, the first antenna 201 may be designed to have a first polarization direction corresponding to +Y to −Y direction and the second antenna 202 may be designed to have a second polarization direction corresponding to +X to −X direction. According to an embodiment, the second antenna 202 may be designed to have a third polarization direction corresponding to +Z to −Z direction in FIG. 2. According to an embodiment, the second antenna 202 may be designed to have substantially the same radiation performance in response to +X to −X direction (for example, second polarization direction) and/or +Z to −Z direction (for example, third polarization direction). According to an embodiment, the first polarization direction may be implemented to be perpendicular to at least one of the second polarization direction and/or the third polarization direction. According to an embodiment, the first antenna 201 and the second antenna 202 may be designed to complement each other. According to an embodiment, the electronic device 101 may secure a wider range of communication coverage using multiple antennas (for example, the first antenna 201 and the second antenna 202) having different characteristics.

According to various embodiments, the electronic device 101 may measure a first signal quality value corresponding to the first antenna 201 having the first polarization direction and a second signal quality value corresponding to the second antenna 202 having the second polarization direction. According to an embodiment, the electronic device 101 may select an antenna (for example, a transmission antenna and a TX antenna) having a relatively excellent signal quality (for example, performance) based on the first signal quality value and the second signal quality value. For example, the electronic device 101 may select one of the first antenna 512 and the conductive pattern antenna 511 capable of transmitting a UWB signal and transmit a UWB signal according to UWB communication using the selected antenna. According to an embodiment, the electronic device 101 may measure an angle of arrival (AoA) with respect to an external electronic device using selected antenna. The electronic device 101 may determine a position of the external electronic device, based on the measured AoA.

According to various embodiments, the electronic device 101 may transmit or receive a UWB signal through the conductive pattern antenna 511 and measure a signal quality value corresponding to at least one of the conductive pattern antenna 511, the first patch antenna 512, the second patch antenna 513, and/or the third patch antenna 514. In addition, the electronic device 101 may transmit or receive a UWB signal through the first patch antenna 512 and measure a signal quality value corresponding to at least one of the conductive pattern antenna 511, the first patch antenna 512, the second patch antenna 513, and/or the third patch antenna 514. According to an embodiment, the electronic device 101 may measure a signal quality, based on multiple transmission antennas and multiple reception antennas, and determine an optimum combination for performing optimum UWB wireless communication. According to an embodiment, the electronic device 101 may determine an optimum frequency band for performing optimum UWB wireless communication, based on a frequency band (for example, about 6.25 GHz-8.25 GHz) corresponding UWB communication.

According to various embodiments, the electronic device 101 may measure a signal quality value for receiving optimum UWB communication performance, based on the first antenna 201 and the second antenna 202 having polarization directions perpendicular to each other. The electronic device 101 may select a transmission antenna showing optimum UWB communication performance at a current state. According to an embodiment, the electronic device 101 may select one of the first antenna 201 and the second antenna 202 and transmit a UWB signal using the selected antenna.

According to various embodiments, the electronic device 101 may transmit a UWB signal in at least one packet unit, based on a timestamp recorded in at least one packet. According to an embodiment, the electronic device 101 may divide a packet into multiple packet areas (for example, a first packet area and/or a second packet area), based on the timestamp in at least one packet. By switching antennas (for example, the first antenna 201 and the second antenna 202), the electronic device 101 may transmit the divided packet areas using antennas different from each other. According to an embodiment, the electronic device 101 may transmit the first packet area using the first antenna 201 having the first polarization characteristic and transmit the second packet area using the second antenna 202 having the second polarization characteristic different from the first polarization characteristic. According to an embodiment, a UWB signal may be separated into units of at least one packet and the packet may be divided into multiple packet areas (for example, a first packet area and/or a second packet area), based on at least one timestamp.

According to an embodiment, when transmitting at least one packet corresponding to a UWB signal, the electronic device 101 may transmit the first packet area using the first antenna 201. After transmitting the first packet, the electronic device 101 may perform switching from the first antenna 201 to the second antenna 202 and transmit the second packet area using the second antenna 202. According to an embodiment, the first packet area and the second packet area may be determined based on at least one timestamp. According to an embodiment, the electronic device 101 may identify a transmission time of the first packet area based on a first timestamp recorded on the first packet area and identify a reception time of a response signal for the first packet area, which is received from an external electronic device. The electronic device 101 may identify a transmission time of the second packet area based on a second timestamp recorded on the second packet area and identify a reception time of a response signal for the second packet area, which is received from an external electronic device.

According to an embodiment, the electronic device 101 may transmit multiple packet areas based on at least one timestamp recorded on at least one packet and measure a reception time corresponding to the transmitted packet area. The electronic device 101 may measure an angle of arrival (AoA) with respect to an external electronic device, based on multiple packet areas. The electronic device 101 may determine a position of the external electronic device, based on the measured AoA. According to an embodiment, using multiple antennas (for example, the first antenna 201 and/or the second antenna 202) having different polarization characteristics, the electronic device 101 may transmit multiple packet areas constituting at least one packet and may identify a relative position (for example, an angle) of an external electronic device more efficiently. For example, a position in which the external electronic device is located may be identified with reference to the electronic device 101. According to an embodiment, the electronic device 101 may separate a first packet area and a second packet area, based on at least one timestamp recorded on at least one packet, and transmit the first packet area using the first antenna 201 and the second packet area using the second antenna 202.

Figure 6:
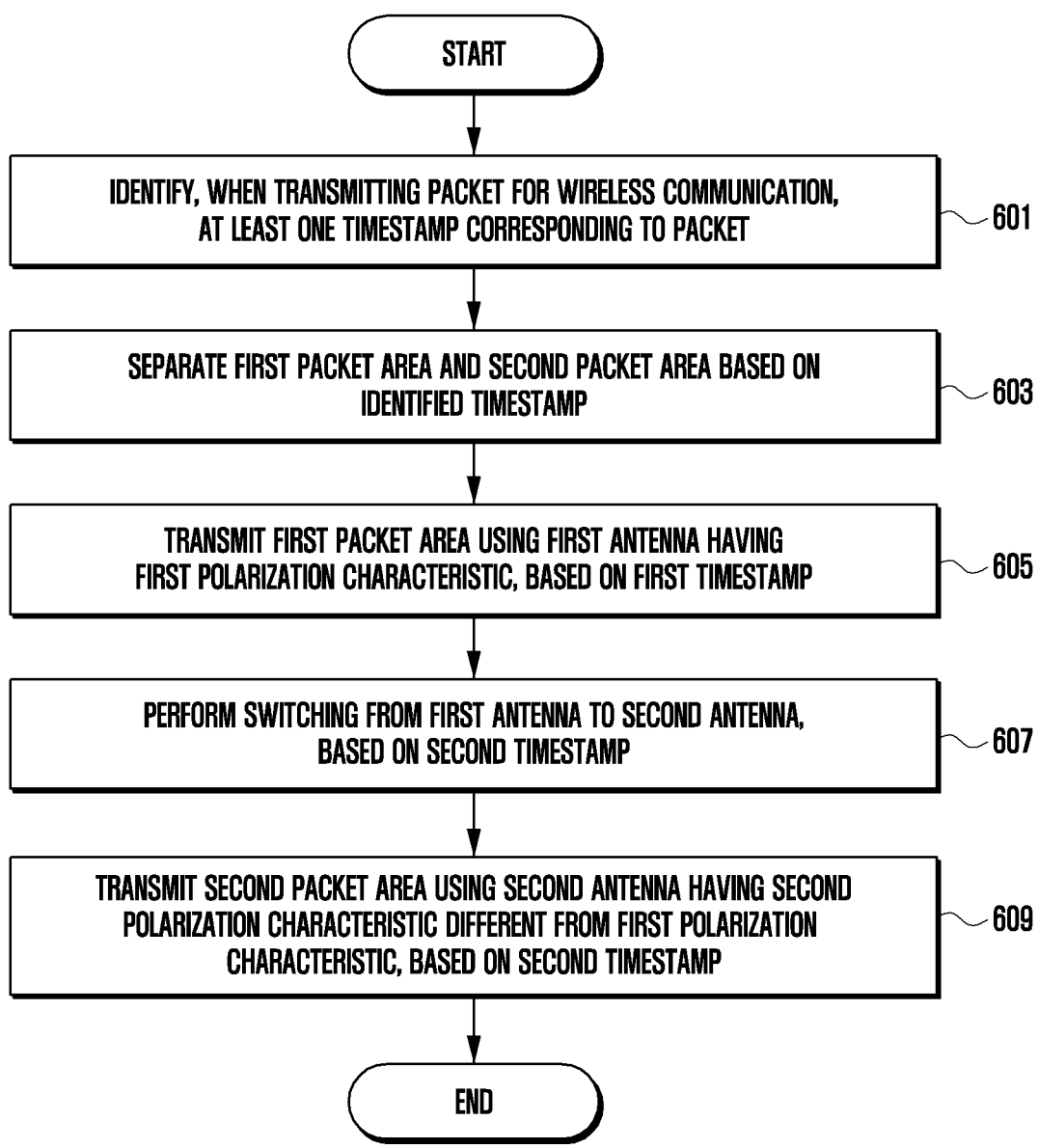
FIG. 6 is a flowchart illustrating an example method for switching antennas based on a first antenna and a second antenna having different polarization characteristics according to various embodiments.

FIG. 6 is a flowchart illustrating an example method for switching antennas based on a first antenna and a second antenna having different polarization characteristics according to various embodiments.

According to various embodiments, an electronic device 101 (for example, the electronic device 101 in FIG. 1) may include multiple antennas (for example, a first antenna (for example, the first antenna 201 in FIG. 2) and/or a second antenna (for example, the second antenna 202 in FIG. 2) having different polarization characteristics and supporting ultra wide band communication. For example, the first antenna 201 may include a metal antenna and/or an LDS antenna, and the second antenna 202 may include one or more patch antennas. According to an embodiment, the first antenna 201 and the second antenna 202 may have polarization characteristics by combining two components of polarization and may be designed to have different characteristics. For example, the first antenna 201 may have a polarization characteristic, based on an H component (horizontal) (for example, an H-pol characteristic) and the second antenna 202 may have a polarization characteristic, based on a V component (vertical) (for example, a V-pol characteristic). According to an embodiment, the first antenna 201 may be designed to have a first polarization direction (for example, +Y to −Y direction in FIG. 2), and the second antenna 202 may be designed to have a second polarization direction (for example, +X to −X direction in FIG. 2). For example, the first polarization direction of the first antenna 201 and the second polarization direction of the second antenna 202 may be perpendicular to each other. According to an embodiment, the first antenna 201 and the second antenna 202 may be designed to complement each other. According to an embodiment, the electronic device 101 may secure a wider range of communication coverage using multiple antennas having different characteristics.

According to an embodiment, the electronic device 101 may perform switching between the first antenna 201 and the second antenna 202 to improve UWB communication performance According to an embodiment, when transmitting at least one packet corresponding to a UWB signal, the electronic device 101 may divide at least one packet into multiple packet areas (for example, a first packet area and/or a second packet area), and transmit the first packet area using the first antenna 201 and the second packet area using the second antenna 202. For example, at least one timestamp (for example, a first timestamp and/or a second timestamp) may be recorded on at least one packet and switching between the first antenna 201 and the second antenna 202 may be performed based on the timestamp. For example, the electronic device 101 may select the first antenna 201 at the first timestamp and transmit the first packet area using the first antenna 201. The electronic device 101 may select the second antenna 202 at the second timestamp and transmit the second packet area using the second antenna 202. According to an embodiment, when transmitting at least one packet, the electronic device 101 may perform switching of the first antenna 201 and/or the second antenna 202 at at least one timestamp.

In operation 601, when transmitting at least one packet for wireless communication (for example, ultra wide band (UWB) communication), the electronic device 101 may identify at least one timestamp corresponding to the packet. For example, at least one packet may include multiple fields and data related to UWB communication may be stored in each field. For example, the packet may be implemented with a structure based on IEEE 802.15.4z, an international standard for UWB communication. According to an embodiment, the electronic device 101 may determine at least two fields of multiple fields included in the packet and record a first timestamp (first timestamp) and a second timestamp (second timestamp) in response to each of the determined fields. For example, the electronic device 101 may record a first timestamp (first timestamp), based on the end of a start frame delimiter (SFD) field of multiple fields and record a second timestamp (second timestamp), based on the end of a scrambled timestamp sequence (STS) field of multiple fields. In operation 601, the processor 120 of the electronic device 101 may identify, when transmitting at least one packet, at least one timestamp (for example, the first timestamp and/or the second timestamp) corresponding to the at least one packet.

In operation 603, the processor 120 may separate the at least one packet into a first packet area and/or a second packet area, based on the identified timestamp. For example, when transmitting at least one packet, the processor 120 may separate the first packet area transmitted at the first timestamp and/or the second packet area transmitted at the second timestamp. The processor 120 may transmit the first packet area at the first timestamp and then transmit the second packet area at the second timestamp. According to an embodiment, the processor 120 may perform an antenna switching operation using gap fields before/after the first timestamp as a reference. For example, the processor 120 may select the first antenna 201 with reference to the first timestamp and the second antenna 202 with reference to the second timestamp.

In operation 605, the processor 120 may transmit the first packet area based on the first timestamp using the first antenna 201 having the first polarization characteristic. For example, the process 120 may select the first antenna 201 of the first antenna 201 and the second antenna 202 at the first timestamp as a reference point and transmit the first packet area at the first timestamp using the first antenna 201.

In operation 607, the processor 120 may perform, based on the second timestamp, switching from the first antenna 201 to the second antenna 202. For example, the second timestamp may be recorded with reference to the end of the STS field included in the packet. The processor 120 may identify a gap at least partially formed in a field next to the STS field, and perform a switching operation from the first antenna 201 to the second antenna 202 based on the gap field. For example, a gap field may be at least partially formed between the STS field and the next field.

In operation 609, the processor 120 may transmit the second packet area based on the second timestamp using the second antenna 202 having the second polarization characteristic different from the first polarization characteristic. For example, the first antenna 201 and/or the second antenna 202 may be implemented to have different characteristics (for example, radiation coverage, polarization performance, a radiation pattern, a radiation direction, gain, and/or a frequency channel characteristic). According to an embodiment, the first polarization characteristic may be implemented to be perpendicular to the second polarization characteristic. For example, as shown in FIG. 2, the first polarization characteristic may be designed to have a first polarization direction corresponding to +Y to −Y direction, and the second antenna 202 may be designed to have a second polarization direction corresponding to +X to −X direction. According to an embodiment, the first antenna 201 and the second antenna 202 may be designed to complement each other. According to an embodiment, the electronic device 120 may transmit the first packet area at the first timestamp using the first antenna 201, and transmit the second packet area at the second timestamp using the second antenna 202.

According to an embodiment, the electronic device 101 may perform switching between the first antenna 201 and the second antenna 202 having different characteristics to transmit at least one packet so as to improve UWB communication performance. For example, at least one packet may be separated into a first packet area and a second packet area, based on at least one timestamp. The electronic device 101 may transmit the first packet area using the first antenna 201, and transmit the second packet area using the second antenna 202.

According to an embodiment, although not shown, the electronic device 101 may transmit at least one packet to an external electronic device and then receive, from the external electronic device, a response signal in response to the transmitted at least one packet. According to an embodiment, the electronic device 101 may perform a positioning operation (for example, an AoA measuring operation) with respect to the external electronic device based on the timestamp at which the at least one packet is transmitted to the external electronic device and the timestamp at which the response signal is received form the external electronic device. According to an embodiment, the electronic device 101 may separate one packet divided into a first packet area and a second packet area and transmit the same, and may respectively receive response signals in response to the first packet area and the second packet area from the external electronic device. According to an embodiment, the external electronic device may be implemented to transmit, to the electronic device 101, response signals in response to the reception of at least one of the first packet area and/or the second packet area, respectively. For example, in response to the reception of the first packet area, the external electronic device may transmit a first response signal to the electronic device 101 and in response to the reception of the second packet area, the external electronic device may transmit a second response signal to the electronic device 101. According to an embodiment, the electronic device 101 may perform a positioning operation with respect to the external electronic device based on the packet signal (for example, the first packet area and/or the second packet area) transmitted to the external electronic device and the response signal received from the external electronic device.

Figure 7:
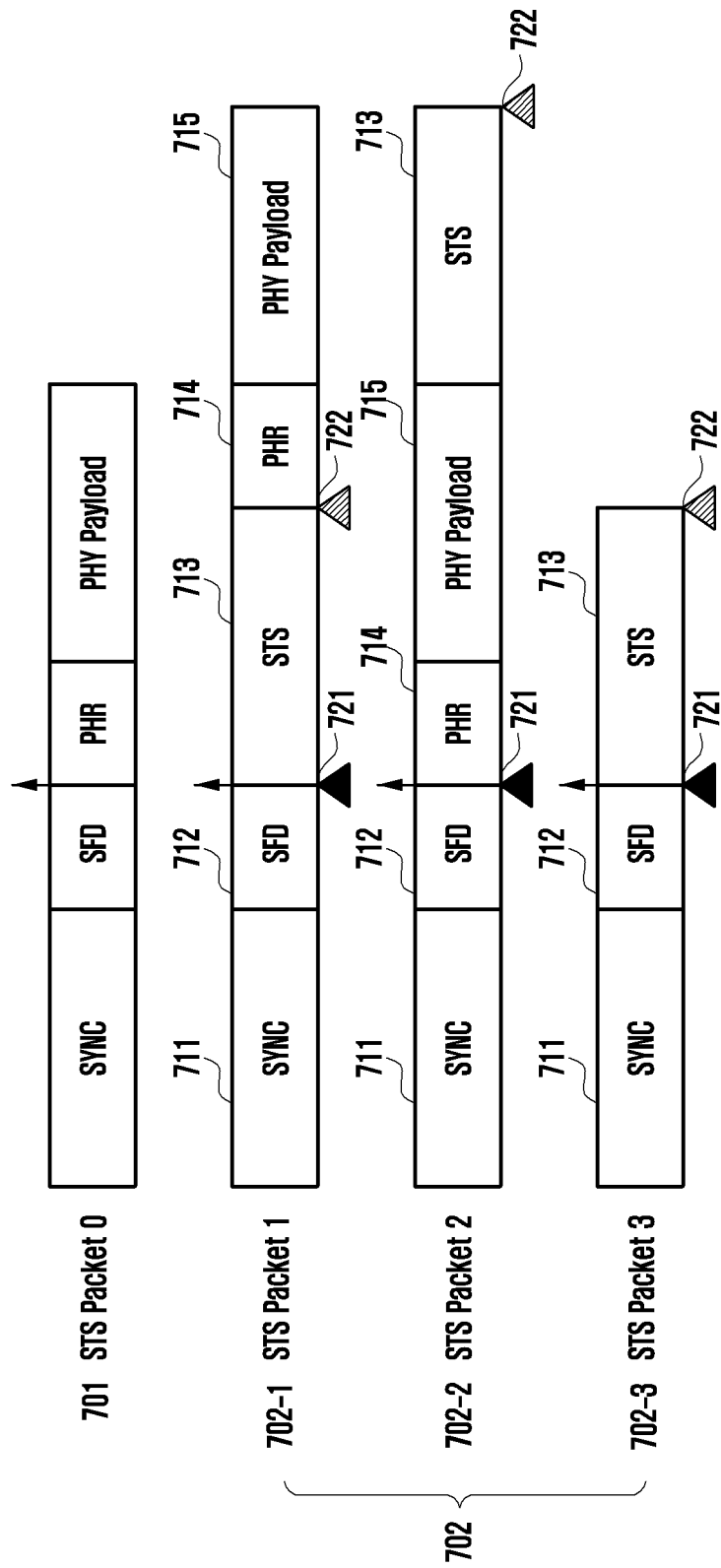
FIG. 7 is a diagram illustrating an example packet structure of a wireless communication signal according to various embodiments.

FIG. 7 is a diagram illustrating an example packet structure of a wireless communication signal according to various embodiments.

According to an embodiment, recent UWB communication may be defined as wireless communication using a packet signal including a UWB packet structure based on IEEE 802.15.4z, an international standard. For example, the UWB packet structure may be separated into STS packet 0 701, STS packet 702, including STS packet 1 702-1, STS packet 2 702-2, and/or STS packet 3 702-3.

FIG. 7 shows a UWB packet structure (for example, STS packet 0 701, STS packet 1 702-1, STS packet 2 702-2, and/or STS packet 3 702-3) based on the international standard IEEE 802.15.4z. The UWB packet structure may include a SYNC field 711 and/or a start of frame delimiter (SFD) field 712. For example, the SYNC field 711 is included in a preamble area of a UWB high rate pulse (HRP) packet and may include data related to synchronization between packets. The SFD field 712 may include data indicating a start of a frame (for example, PHY header (PHR)) field 714 and a PHY payload field 715) and may be used as a reference point of timestamp (TS). For example, the end point of the SFD field 712 may be recorded as one timestamp. According to an embodiment, an electronic device (for example, the electronic device 101 in FIG. 1) may record the end point of the SFD field 712 as a first timestamp 721. For example, the electronic device 101 may select a first antenna (for example, the first antenna 201 in FIG. 2) at the first timestamp 721 and perform a positioning operation based on the first timestamp 721. According to an embodiment, the UWB packet structure may be divided into at least one packet area, based on one timestamp, and at least one packet area may be transmitted to an external electronic device at at least one timestamp. For example, referring to FIG. 7, the UWB packet structure may be separated into a first packet area and/or a second packet area, based on the first timestamp 721. For example, the first packet area may include an SYNC field 711 and/or an SFD field 712, and the second packet area may include at least one of an STS field 713, a PHY header (PHR) field 714, and/or a PHY payload filed 715.

FIG. 7 shows three UWB packet structures 702 (for example, STS packet 1 702-1, STS packet 2 702-2, and/or STS packet 3 702-3) including an STS. For example, the UWB packet structure 702 may be defined as a structure including STS packet 1 702-1, STS packet 2 702-2, and/or STS packet 3 702-3 excluding STS packet 0 701. The UWB packet structure 702 may include a scrambled timestamp sequence (STS) field 713. For example, the STS field 713 is a field added for solving a security problem of the international standard IEEE 802.15.4z and may include a sequence having security integrity by generating a random number based on a specific seed. According to an embodiment, the UWB packet structure 702 may be defined as a packet structure having a strengthened security based on the STS field 713.

Referring to FIG. 7, STS packet 0 701, STS packet 1 702-1, and/or STS packet 2 702-2 may include a PHY header (PHR) field 714 and a PHY payload field 715. For example, the PHR field 714 and the PHY payload field 715 may be defined as one PHY frame. The PHR field 714 may be defined as a header in which information such as upon a transmission of specific data, a coding and rate of the data is compressed. The PHY payload field 715 may include a field in which the specific data is stored.

According to an embodiment, the electronic device 101 performing UWB communication may record, based on the UWB packet structure 702, the end point of the SFD field 712 as a first timestamp 721 and record the end point of the STS field 713 as a second timestamp 722. According to an embodiment, when transmitting at least one packet, the electronic device 101 may record multiple timestamps (timestamp) (for example, the first timestamp 721 and/or the second timestamp 722). According to an embodiment, the electronic device 101 may separate and transmit a first packet area (for example, the SYNC field 711 and/or the SFD field 712) and a second packet area (for example, the STS field 713, the PHY header (PHR) field 714, and/or the PHY payload field 715) based on the first timestamp 721. According to an embodiment, the electronic device 101 may the first packet area and the second packet area using a first antenna (for example, the first antenna 201 in FIG. 2) and a second antenna (for example, the second antenna 202 in FIG. 2) having different characteristics. For example, the electronic device 101 may transmit the first packet area using the first antenna 201, and transmit the second packet area using the second antenna 202. According to an embodiment, the electronic device 101 may perform, based on the first timestamp, switching to select at least one of the first antenna 201 and the second antenna 202 in at least one packet. According to an embodiment, the electronic device 101 may transmit the first packet area using the first antenna 201 at the first timestamp, and switch from the first antenna 201 to the second antenna 202 at the second timestamp and then transmit the second packet area using the second antenna 202.

According to an embodiment, the electronic device 101 may divide at least one packet into a first packet area and a second packet area and transmit the divided first packet area and second packet area to an external electronic device (for example, a target device). The external electronic device may transmit, in response to the received packet, a response signal to the electronic device 101. According to an embodiment, the electronic device 101 may perform a positioning operation with respect to the external electronic device based on the first packet area transmitted to the external electronic device and the first response signal in response to the first packet area. According to an embodiment, the electronic device 101 may perform a positioning operation with respect to the external electronic device based on the second packet area transmitted to the external electronic device and the second response signal in response to the second packet area. According to an embodiment, the electronic device 101 may perform switching between the first antenna 201 and/or the second antenna 202 upon reception of the first response signal and/or the second response signal. For example, the electronic device 101 may receive the first response signal using the first antenna 201, and receive the second response signal using the second antenna 202.

According to an embodiment, the electronic device 101 may transmit at least one packet area to an external electronic device using at least one of the first antenna 201 and the second antenna 202 having different characteristics. For example, the electronic device 101 may transmit, to an external electronic device, the first packet area using the first antenna 201 having the first polarization characteristic and transmit, to an external electronic device, the second packet area using the second antenna 202 having the second polarization characteristic. The first antenna 201 may be designed to have a first polarization direction (for example, +Y to −Y direction in FIG. 2) and the second antenna 202 may be designed to have a second polarization direction (for example, +X to −X direction in FIG. 2). According to an embodiment, the first antenna 201 and the second antenna 202 may be designed to complement each other. According to an embodiment, the electronic device 101 may perform UWB communication using the first antenna 201 and/or the second antenna 202 having different characteristics, and thus expand a communication range (for example, a range, and a coverage) of UWB communication.

Figure 8:
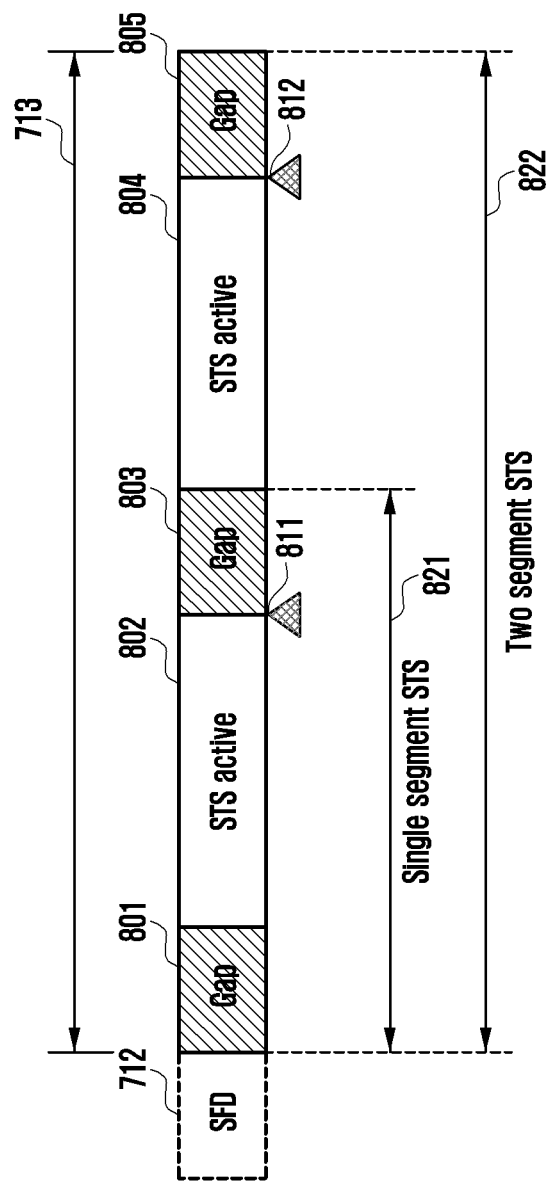
FIG. 8 is a diagram illustrating an example structure of an STS field included in a wireless communication signal according to various embodiments.

FIG. 8 is a diagram illustrating an example structure of an STS field 713 included in a wireless communication signal according to various embodiments.

Referring to FIG. 8, a structure of an STS field 713 disposed after a SFD field 712 is shown. According to an embodiment, the STS field 713 may include at least one gap section 801, 803, and 805 of about 1 us. According to an embodiment, the UWB packet structure 702 may be configured by consecutively including the SFD field 712, the gap section 801, and/or an STS active field 802, and the gap section 801 and the STS active field 802 may be fields partially included in the STS field 713. For example, the gap section 801 may be configured to have about 1 us in length. According to an embodiment, the electronic device 101 may require about 100-200 ns as switching time when performing switching to a first antenna (for example, the first antenna 201 in FIG. 2) and/or a second antenna (for example, the second antenna 202 in FIG. 2). According to an embodiment, the electronic device 101 may performing an operation of switching to the first antenna 201 and/or the second antennas using the gap section 801 formed between the SFD field 712 and the STS active field 802.

Referring to FIG. 8, the STS field 713 may include multiple gap sections 801, 803, and 805 and/or multiple STS active fields 802 and 804. According to an embodiment, the STS field 713 may be divided into a single segment STS 821 and/or a two segment STS 822 with reference to the second gap section 803. According to an embodiment, the electronic device 101 may record two timestamps (timestamp) 811 and 812 in the STS field 713 and perform an antenna switching operation using the gap section 801, 803, and 805.

According to an embodiment, when transmit at least one packet to an external electronic device, the electronic device 101 may record at least one timestamp (for example, the first timestamp 811 and/or the second timestamp 812) and divide the packet into at least one packet area with reference to the at least one timestamp. The electronic device 101 may perform a switching operation to select at least one of the first antenna 201 and/or the second antenna 202 through a gap section disposed based on the at least one timestamp.

Figure 9:
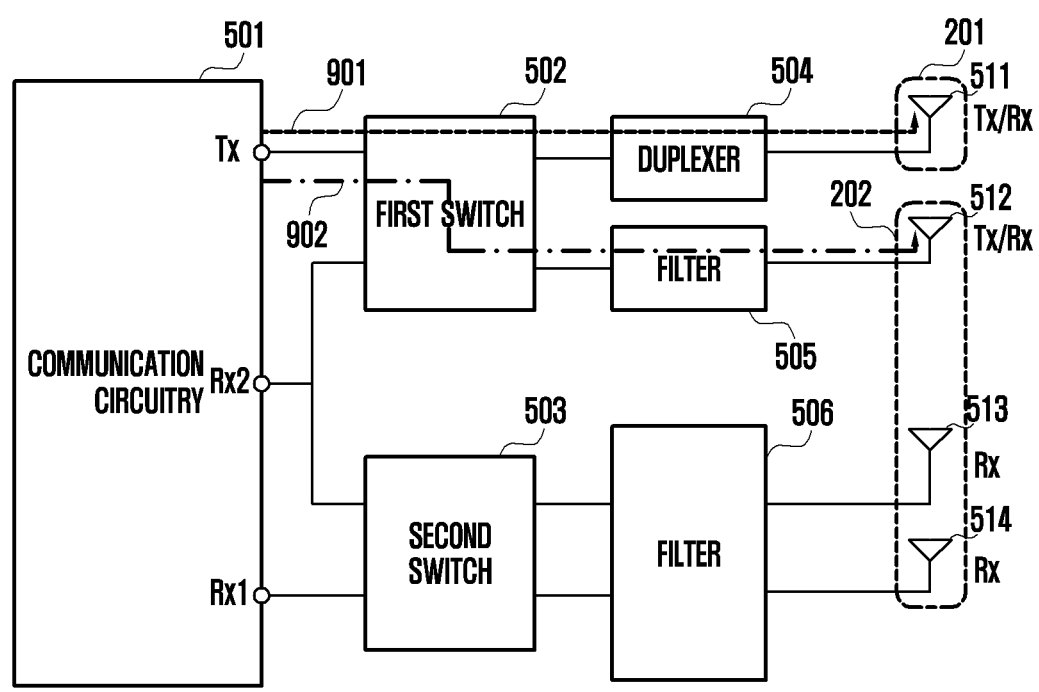
FIG. 9 is a block diagram illustrating an example transmission path of a wireless communication signal based on a first antenna and a second antenna having different polarization characteristics according to various embodiments.

FIG. 9 is a diagram illustrating an example transmission path of a wireless communication signal (for example, a UWB signal) based on a first antenna 201 and a second antenna 202 having different polarization characteristics according to various embodiments.

FIG. 9 is a view showing an additional first path 901 and/or second path 902 to the diagram illustrating an example configuration of the communication circuitry shown in FIG. 5. According to an embodiment, when transmitting at least one packet to an external electronic device (for example, a target device), the electronic device 101 may identify at least one timestamp recorded in the at least one packet. The electronic device 101 may divide the same into multiple packet areas (for example, a first packet area and/or a second packet area), based on the timestamp. According to an embodiment, the electronic device 101 may transmit the first packet area to an external electronic device based on the first path 901 and transmit the second packet area to the external electronic device based on the second path 902. For example, the electronic device 101 may select the first antenna 201 (for example, the conductive pattern antenna 511 in FIG. 5) based on at least one timestamp and transmit the first packet area to an external electronic device using the first antenna 201. For another example, the electronic device 101 may select the second antenna 202 (for example, the first patch antenna 512 in FIG. 5) based on at least one timestamp and transmit the second packet area to an external electronic device using the second antenna 202.

According to an embodiment, a gap section may be formed between the first packet area and the second packet area, and the electronic device 101 may perform a switching operation to select at least one of the first antenna 201 and/or the second antenna 202, based on the gap section. According to an embodiment, the first antenna 201 and/or the second antenna 202 may be antennas having different characteristics (for example, radiation coverage, polarization performance, a radiation pattern, a radiation direction, gain, and/or a frequency channel characteristic). The first antenna 201 may be designed to have a first polarization direction (for example, +Y to −Y direction in FIG. 2) and the second antenna 202 may be designed to have a second polarization direction (for example, +X to −X direction in FIG. 2). According to an embodiment, the first antenna 201 and the second antenna 202 may be designed to complement each other. According to an embodiment, the electronic device 101 may perform UWB communication by switching of the first antenna 201 and/or the second antenna 202, and thus maintain or improve the UWB communication performance. The electronic device 101 may expand a communication coverage according to UWB communication.

According to an embodiment, the electronic device 101 may receive a first response signal in response to the first packet area transmitted to an external electronic device and a second response signal in response to the second packet area. For example, the electronic device 101 may receive the first response signal using the first antenna 201, and receive the second response signal using the second antenna 202. The electronic device 101 may perform a switching operation to select at least one of the first antenna 201 and/or the second antenna 202 when receiving the first response signal and the second response signal. According to an embodiment, the electronic device 101 may perform a positioning operation with respect to an external electronic device in response to the reception of the first response signal and the second response signal.

A method according to various example embodiments may include: identifying at least one timestamp of the packet based on transmitting at least one packet using a first antenna (for example, the first antenna 201 in FIG. 2) having a first polarization characteristic, transmitting a first area of the packet using the first antenna based on a first timestamp of the identified timestamps, switching from the first antenna to a second antenna (for example, the second antenna 202 in FIG. 2) having an characteristic different from that of the first antenna, based on a second timestamp of the identified timestamps, and transmitting a second area of the packet using the second antenna, based on the second timestamp of the packet.

According to an example embodiment, the characteristics may include at least one of radiation coverage, polarization performance, a radiation pattern, a radiation direction, gain, and/or a frequency channel characteristic.

According to an example embodiment, the switching from the first antenna to a second antenna may include: measuring a first signal quality value of a wireless communication signal based on the first antenna, measuring a second signal quality value of a wireless communication signal based on the second antenna, and determining whether to switch to select at least one of the first antenna and the second antenna, based on the first signal quality value and the second signal quality value.

According to an example embodiment, the first antenna may have a first polarization characteristic based on a conductive member comprising a metal material and may include a metal antenna at least a portion of which is formed of a metal material and/or a laser direct structuring (LDS) antenna at least a portion of which has a metal pattern designed thereon.

According to an example embodiment, the second antenna may support wideband communication and include one or more patch antennas designed to measure a position with respect to an external electronic device.

The method according to an example embodiment may further include measuring a position with respect to the external electronic device using at least two patch antennas of the one or more patch antennas.

The method according to an example embodiment may further transmitting a second area of the packet and then switching from the second antenna to the first antenna.

The method according to an example embodiment may further include configuring, as a first timestamp, a timestamp at which a start of frame delimiter (SFD) field included in the packet and indicating a frame start is ended and configuring, as a second timestamp, a timestamp at which a scrambled timestamp sequence field included in the packet and having security-related information stored therein is ended.

The method according to an example embodiment may further include configuring the second timestamp, based on at least one gap area included in the STS field.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The embodiments of the present disclosure and the accompanying drawings are only examples provided to easily describe the present disclosure and facilitate comprehension of the present disclosure, but are not intended to limit the scope of the present disclosure. Therefore, in addition to the embodiments disclosed herein, the scope of the present disclosure should be understood to include all modifications or modified forms drawn based on the present disclosure and includes the appended claims and their equivalents. It will also be understood that any of the embodiment(s) described herein may be used in conjunction with any other embodiment(s) described herein.

What is claimed is:

1. An electronic device comprising:
   a communication module comprising communication circuitry;
   a first antenna having a first polarization characteristic;
   a second antenna having a second polarization characteristic different from the first polarization characteristic;
   a switch operatively connected to the communication module, the first antenna, and the second antenna;
   a processor operatively connected to the first antenna and the second antenna through the switch; and
   memory storing instructions,
   wherein the instructions, when executed by the processor, cause the electronic device to:
   identify, in response to transmitting at least one packet using the first antenna, one or more timestamps of the at least one packet,
   transmit, via the communication module, a first area of the at least one packet using the first antenna based on a first timestamp of the identified one or more timestamps,
   switch from the first antenna to the second antenna, based on a second timestamp of the identified one or more timestamps, and
   transmit, via the communication module, a second area of the at least one packet using the second antenna based on the second timestamp of the at least one packet, wherein the second antenna is configured to support wideband communication and comprises one or more patch antennas configured to determine a position of an external electronic device with respect to the electronic device.

2. The electronic device of claim 1, wherein the first antenna and the second antenna have different characteristics, and
wherein the characteristics comprise at least one of radiation coverage, polarization performance, a radiation pattern, a radiation direction, gain, and/or a frequency channel characteristic.

3. The electronic device of claim 1, wherein the instructions, when executed by the processor, cause the electronic device to:
measure a first signal quality value of a wireless communication signal based on the first antenna,
measure a second signal quality value of a wireless communication signal based on the second antenna, and
determine whether to switch to select at least one of the first antenna and the second antenna based on the first signal quality value and the second signal quality value.

4. The electronic device of claim 1, wherein the first antenna has the first polarization characteristic based on a conductive member included in the first antenna.

5. The electronic device of claim 4, wherein the first antenna comprises a metal antenna at least a portion of which comprises a metal material and/or a laser direct structuring (LDS) antenna at least a portion of which has a metal pattern designed thereon.

6. The electronic device of claim 1, wherein the instructions, when executed by the processor, cause the electronic device to: measure a position with respect to the external electronic device using at least two patch antennas of the one or more patch antennas.

7. The electronic device of claim 1, wherein the first antenna and the second antenna are configured to have characteristics complementary to each other to provide a wider communication coverage.

8. The electronic device of claim 1, wherein the instructions, when executed by the processor, cause the electronic device to:
transmit, via the communication module, the second area of the at least one packet using the second antenna, and
switch from the second antenna to the first antenna.

9. The electronic device of claim 1, wherein the instructions, when executed by the processor, cause the electronic device to:
configure, as the first timestamp, a timestamp at which a start of frame delimiter (SFD) field included in the at least one packet is ended,
wherein the start of frame delimiter (SFD) field indicates a frame start.

10. The electronic device of claim 1, wherein the instructions, when executed by the processor, cause the electronic device to:
configure, as the second timestamp, a timestamp at which a scrambled timestamp sequence (STS) field included in the at least one packet is ended,
wherein the scrambled timestamp sequence (STS) field includes security related information.

11. The electronic device of claim 10, wherein the instructions, when executed by the processor, cause the electronic device to;
configure the second timestamp based on at least one gap area included in the STS field.

12. A method comprising:
identifying, in response to transmitting at least one packet using a first antenna having a first polarization characteristic, one or more timestamps of the at least one packet;
transmitting a first area of the at least one packet using the first antenna based on a first timestamp of the identified one or more timestamps;
switching from the first antenna to a second antenna having an second polarization characteristic different from the first polarization characteristic of the first antenna based on a second timestamp of the identified one or more timestamps; and
transmitting a second area of the at least one packet using the second antenna based on the second timestamp of the at least one packet,
wherein the second antenna supports wideband communication and comprises one or more patch antennas configured to determine a position of an external electronic device with respect to the electronic device.

13. The method of claim 12, wherein the first antenna and the second antenna have different characteristics, and
wherein the characteristics comprise at least one of radiation coverage, polarization performance, a radiation pattern, a radiation direction, gain, and/or a frequency channel characteristic.

14. The method of claim 12, wherein the switching from the first antenna to the second antenna comprises
measuring a first signal quality value of a wireless communication signal based on the first antenna;
measuring a second signal quality value of a wireless communication signal based on the second antenna; and
determining whether to switch to select at least one of the first antenna and the second antenna based on the first signal quality value and the second signal quality value.

15. The method of claim 12, wherein the first antenna is implemented to have a first polarization characteristic based on a conductive member included in the first antenna and comprises a metal antenna at least a portion of which comprises a metal material and/or a laser direct structuring (LDS) antenna at least a portion of which has a metal pattern designed thereon.

16. The method of claim 12,
wherein the method further comprises measuring a position with respect to the external electronic device using at least two patch antennas of the one or more patch antennas.

17. The method of claim 12, further comprising transmitting the second area of the at least one packet using the second antenna, and switching from the second antenna to the first antenna.

18. The method of claim 12, further comprising
configuring, as the first timestamp, a timestamp at which a start of frame delimiter (SFD) field included in the at least one packet is ended; and
configuring, as the second timestamp, a timestamp at which a scrambled timestamp sequence (STS) field included in the at least one packet is ended,
wherein the start of frame delimiter (SFD) field indicates a frame start, and
wherein the scrambled timestamp sequence (STS) field includes security related information.

19. The method of claim 18, further comprising configuring the second timestamp based on at least one gap area included in the STS field.

* * * * *